(12) United States Patent
Liu et al.

(10) Patent No.: US 11,418,055 B1
(45) Date of Patent: Aug. 16, 2022

(54) ENERGY STORAGE SYSTEM AND POWER SUPPLY METHOD THEREOF

(71) Applicant: Merry Electronics(Shenzhen) Co., Ltd., ShenZhen (CN)

(72) Inventors: Yung-Hsiang Liu, Taichung (TW); Wei-Kang Liang, Taichung (TW); Yu-Kai Wang, Taichung (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 0 days.

(21) Appl. No.: 17/335,092

(22) Filed: Jun. 1, 2021

(30) Foreign Application Priority Data

Feb. 9, 2021 (TW) .................................. 110104890

(51) Int. Cl.
  *H02J 9/06* (2006.01)
  *H02J 7/00* (2006.01)
(52) U.S. Cl.
  CPC ............ *H02J 9/068* (2020.01); *H02J 7/0013* (2013.01)

(58) Field of Classification Search
  CPC .............................. H02J 9/068; H02J 7/0013
  See application file for complete search history.

(56) References Cited

U.S. PATENT DOCUMENTS

2011/0133558 A1\* 6/2011 Park ....................... H02J 3/005
  307/66

\* cited by examiner

*Primary Examiner* — Toan T Vu
(74) *Attorney, Agent, or Firm* — JCIPRNET (57) ABSTRACT

An energy storage system and a power supply method thereof are provided. First and second energy storage devices are connected in series between an AC power source and a load. When the AC power source is normal, the AC power source is used to charge the first energy storage device and provided to the second energy storage device for charging. When the AC power source is abnormal, an output of the first energy storage device is switched from the AC power source to a first energy storage power source, and the second energy storage device is disabled from using the first energy storage power source for charging. A power source provided by the first energy storage device or a second energy storage power source provided by the second energy storage circuit is output to the load according to a power supply state of the first energy storage device.

20 Claims, 11 Drawing Sheets

ENERGY STORAGE SYSTEM AND POWER SUPPLY METHOD THEREOF

CROSS-REFERENCE TO RELATED APPLICATION

This application claims the priority benefit of Taiwan application serial no. 110104890, filed on Feb. 9, 2021. The entirety of the above-mentioned patent application is hereby incorporated by reference herein and made a part of this specification.

TECHNICAL FIELD

The disclosure relates to a power supply apparatus, and more particularly to an energy storage system and a power supply method thereof.

BACKGROUND

In order to ensure stable operation of electrical equipment, a power supply apparatus with dual input power sources is commonly adopted to supply power to the electrical equipment. A power supply apparatus with dual input power sources is commonly provided with an automatic transfer switch (ATS) that automatically switches the power supply source of the electrical equipment from the main input power source to the backup input power source when the main input power source is abnormal, so as to prevent the electrical equipment from failing to operate due to power supply interruption, thereby making the electrical equipment reliable.

Although the backup input power source can solve power supply problems of the electrical equipment, the power capacity of the backup input power source is generally limited, so the time during which the backup input power source can provide power to the electrical equipment is limited as well. Therefore, how to increase the power capacity of the backup input power source to extend the power supply time of the backup input power source has become an issue for people of ordinary skills in the art to work on.

SUMMARY

The disclosure provides an energy storage system and a power supply method thereof, which can effectively increase the total discharge capacity of the energy storage system and greatly extend the power supply time.

An energy storage system according to an embodiment of the disclosure includes a first energy storage device and a second energy storage device. The input terminal of the first energy storage device is coupled to an AC power source. The second energy storage device and the first energy storage device are connected in series between the AC power source and a load. The input terminal and output terminal of the second energy storage device are respectively coupled to the input terminal of the first energy storage device and the load. The first energy storage device includes a first energy storage circuit, a first switching circuit, and a first control circuit. The first energy storage circuit is coupled to the AC power source and uses the AC power source for charging. The first switching circuit is coupled to the first energy storage circuit, the input terminal and output terminal of the first energy storage device. The first control circuit is coupled to the first energy storage circuit, the first switching circuit, and the input terminal of the first energy storage device, controlling the first switching circuit to switch between outputting the AC power source and outputting a first energy storage power source provided by the first energy storage circuit to the output terminal of the first energy storage device according to whether the AC power source is abnormal. The second energy storage device and the first energy storage device are connected in series between the AC power source and the load. The input terminal and output terminal of the second energy storage device are respectively coupled to the output terminal of the first energy storage device and the load. The second energy storage device includes a second energy storage circuit, a second switching circuit, and a second control circuit. The second energy storage circuit is coupled to the input terminal of the second energy storage device and uses the AC power source provided by the first energy storage device for charging. The second switching circuit is coupled to the second energy storage circuit, the input terminal and output terminal of the second energy storage device. The second control circuit is coupled to the second energy storage circuit, the second switching circuit, and the input terminal of the second energy storage device, controlling the second switching circuit to switch between outputting a power source provided by the first energy storage device and outputting a second energy storage power source provided by the second energy storage circuit to the load according to a power supply state of the first energy storage device.

The disclosure further provides a power supply method of an energy storage system. The energy storage system includes a first energy storage device and a second energy storage device connected in series between an AC power source and a load. The power supply method of the energy storage system includes the following steps. It is detected whether the AC power source is abnormal. If the AC power source is normal, the first energy storage device is charged by using the AC power source, and the AC power source is provided to the second energy storage device for charging. If the AC power source is abnormal, an output of the first energy storage device is switched from the AC power source to a first energy storage power source, and the second energy storage device is disabled from using the first energy storage power source for charging. A power source provided by the first energy storage device or a second energy storage power source provided by the second energy storage circuit is output to the load according to a power supply state of the first energy storage device.

Based on the above, according to the embodiments of the disclosure, the first energy storage device and the second energy storage device are connected in series between the AC power source and the load. When the AC power source is normal, the first energy storage device may be charged by using the AC power source, and the AC power source may be provided to the second energy storage device for charging. When the AC power source is abnormal, the output of the first energy storage device may be switched from the AC power source to the first energy storage power source, and the second energy storage device may be disabled from using the first energy storage power source for charging. In addition, the power source provided by the first energy storage device or the second energy storage power source provided by the second energy storage circuit is output to the load according to the power supply state of the first energy storage device. This way, by connecting the first energy storage device and the second energy storage device in series between the AC power source and the load and adjusting the power supply of the first energy storage device and the second energy storage device according to the power supply state of the AC power source, the total discharge capacity of the energy storage system may be effectively increased, and the power supply time may be greatly extended.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the present preferred embodiments of the disclosure, examples of which are illustrated in the accompanying drawings. Wherever possible, the same reference numbers are used in the drawings and the description to refer to the same or like parts.

Figure 1:
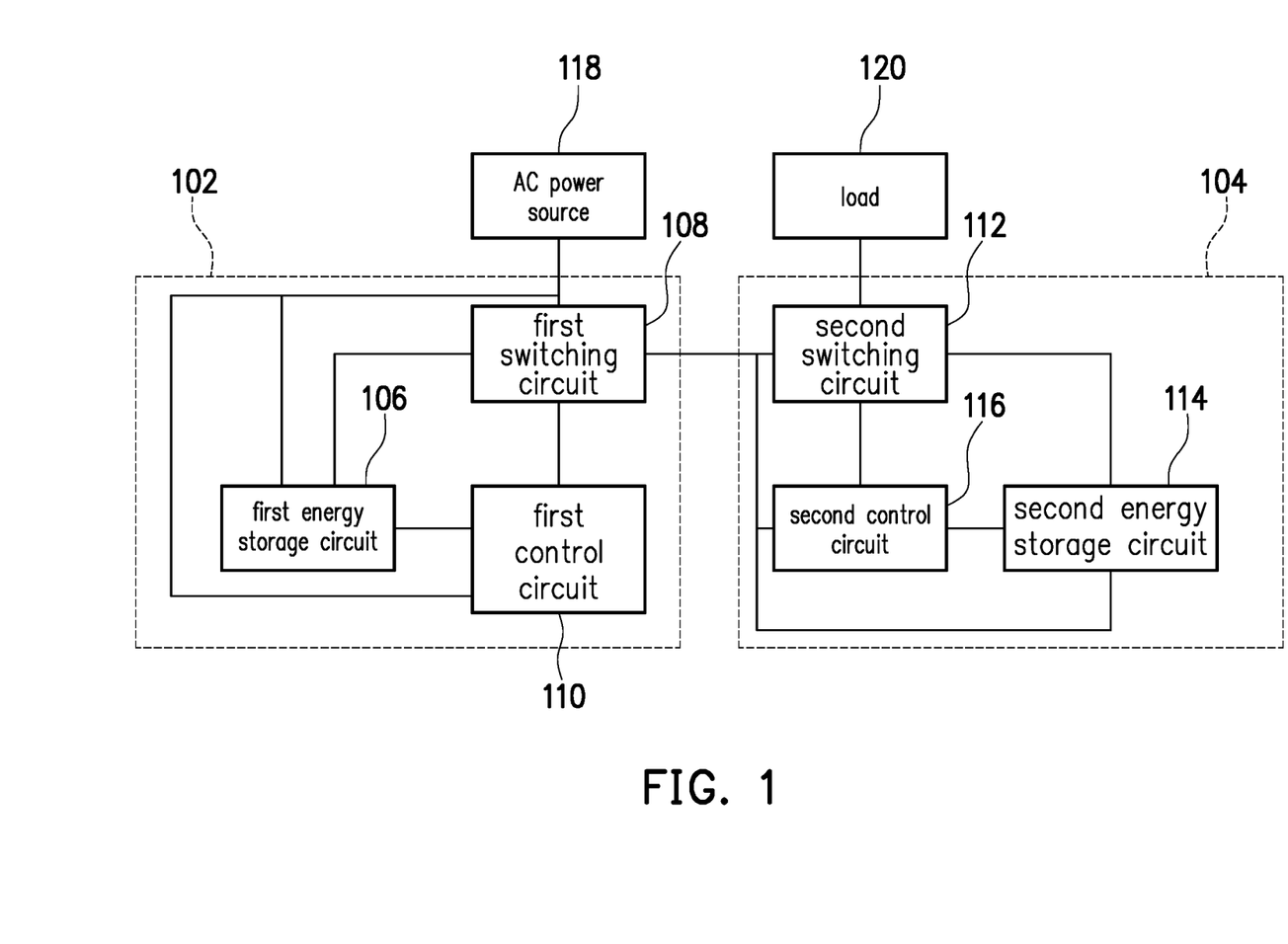
FIG. 1 is a schematic diagram of an energy storage system according to an embodiment of the disclosure.

FIG. 1 is a schematic diagram of an energy storage system according to an embodiment of the disclosure. With reference to FIG. 1, the energy storage system includes a first energy storage device 102 and a second energy storage device 104. The first energy storage device 102 and the second energy storage device 104 are connected in series between an AC power source 118 and a load 120. An input terminal of the first energy storage device 102 is coupled to the AC power source 118, and an input terminal and an output terminal of the second energy storage device 104 are respectively coupled to an output terminal of the first energy storage device 102 and the load 120. In more detail, the first energy storage device 102 may include a first energy storage circuit 106, a first switching circuit 108, and a first control circuit 110. The first energy storage circuit 106 is coupled to the AC power source 118, the first switching circuit 108, and the first control circuit 110. The first switching circuit 108 is further coupled to the input terminal and an output terminal of the first energy storage device 102. The first control circuit 110 is further coupled to the first switching circuit 108 and the input terminal of the first energy storage device 102. In addition, the second energy storage device 104 may include a second switching circuit 112, a second energy storage circuit 114, and a second control circuit 116. The second switching circuit 112 is coupled to the second energy storage circuit 114, the second control circuit 116, and the input terminal and the output terminal of the second energy storage device 104. The second control circuit 116 is coupled to the second energy storage circuit 114 and the input terminal of the second energy storage device 104. The second energy storage circuit 114 is further coupled to the input terminal of the second energy storage device 104.

The first energy storage circuit 106 may use the power provided by the AC power source 118 for charging. According to whether the power supply condition of the AC power source 118 is abnormal, the first control circuit 110 may control the first switching circuit 108 to switch between outputting the AC power source 118 and outputting a first energy storage power source (which is also an AC power source) provided by the first energy storage circuit 106 to the output terminal of the first energy storage device 102. A power supply abnormality of the AC power source 118 may result from an abnormal voltage or an abnormal frequency of the AC power source 118. Due to such abnormality, the AC power source 118 may be unable to be supplied normally. According to the power supply state of the output terminal of the first energy storage device 102, the second control circuit 116 of the second energy storage device 104 may switch between outputting a power source provided by the first energy storage device 102 and outputting a second energy storage power source provided by the second energy storage circuit 114 to the load 120 to supply the load 120 with the power required for the load 120 to operate.

In more detail, when the power supply condition of the AC power source 118 is normal, the first energy storage device 102 is in a bypass mode. The AC power source 118 provided by the first energy storage device 102 may serve to supply power to the load 120 while charging the second energy storage circuit 114. When the first control circuit 110 detects that the AC power source 118 is abnormal, the first energy storage device 102 enters a battery mode. At the time, the first control circuit 110 may control the first switching circuit 108 to switch an output of the first energy storage device 102 to the first energy storage power source provided by the first energy storage circuit 106 to continuously supply power to the load 120. In order to prevent the first energy storage power source provided by the first energy storage circuit 106 from being provided to the second energy storage circuit 114, the first control circuit 110 may control the first energy storage circuit 106 to output the first energy storage power source that conforms to a first preset signal characteristic during a first preset period to notify the second energy storage device 104 that the current power supply source is the first energy storage circuit 106. Since the second energy storage device 104 has stored the first preset signal characteristic in advance, the second energy storage device 104 may disable the second energy storage circuit 114 from using the power source provided by the first energy storage device 102 for charging when detecting that the power source provided by the first energy storage device 102 conforms to the first preset signal characteristic during the first preset period.

Figure 2:
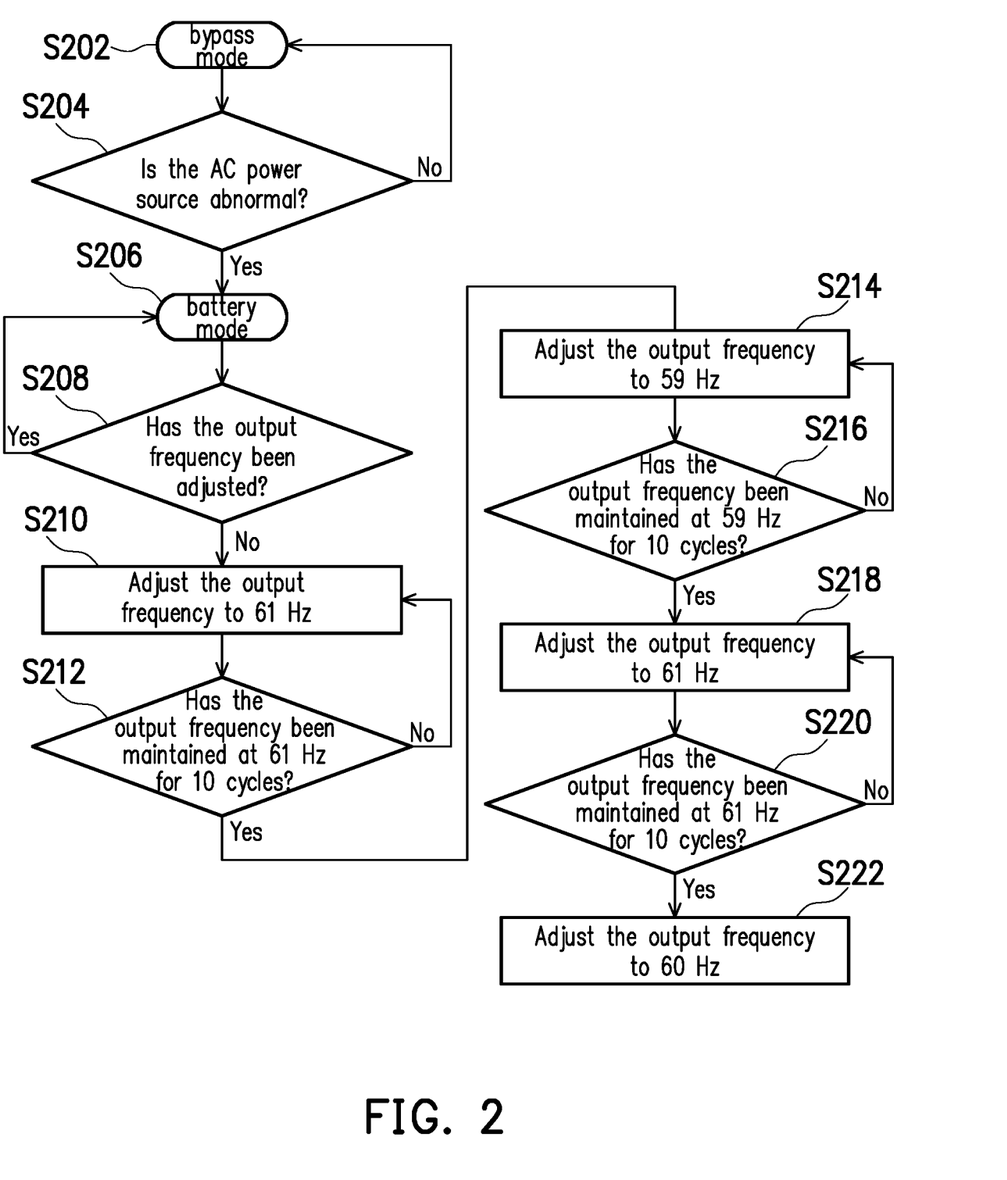
FIG. 2 is a flowchart of power source frequency changes of a first energy storage device according to an embodiment of the disclosure.

The first preset signal characteristic includes a first preset frequency change rule, which is a preset power source frequency change sequence and may, for example, serve to switch multiple frequency values of the power source provided by the first energy storage device according to a first sequence during the first preset period, where each frequency value is maintained for a corresponding period of time. For example, FIG. 2 is a flowchart of power source frequency changes of a first energy storage device 102 according to an embodiment of the disclosure. In the embodiment, the first energy storage device 102 is in the bypass mode (step S202) in the beginning. The first control circuit 110 detects whether the AC power source 118 is abnormal (step S204). If the AC power source 118 is not abnormal, the flow may return to step S202 for continuously detecting the power supply condition of the AC power source 118. If the AC power source 118 is abnormal, the first energy storage device 102 enters battery mode (step S206). In following, the first control circuit 110 determines whether the first energy storage circuit 106 is controlled to adjust the output frequency of the first energy storage power source (step S208). If the output frequency of the first energy storage power source has been adjusted, the flow returns to step S206. If the output frequency of the first energy storage power source has not been adjusted, the output frequency of the first energy storage power source is adjusted to 61 Hz (step S210), and then it is determined whether the output frequency of the first energy storage power source has been maintained at 61 Hz for 10 cycles (step S212), each of which includes a positive half-cycle and a negative half-cycle of a power source signal (the first energy storage power source). If the output frequency of the first energy storage power source fails to be maintained at 61 Hz for 10 cycles, the flow returns to step S210 for continuing to adjust the output frequency of the first energy storage power source to 61 Hz. If the output frequency of the first energy storage power source has been maintained at 61 Hz for 10 cycles, the output frequency of the first energy storage power source is adjusted to 59 Hz (step S214). Next, it is determined whether the output frequency of the first energy storage power source has been maintained at 59 Hz for 10 cycles (step S216). If the output frequency of the first energy storage power source fails to be maintained at 59 Hz for 10 cycles, the flow returns to step S214 for continuing to adjust the output frequency of the first energy storage power source to 59 Hz. If the output frequency of the first energy storage power source has been maintained at 59 Hz for 10 cycles, the output frequency of the first energy storage power source is adjusted to 61 Hz (step S218). Afterwards, it is determined whether the output frequency of the first energy storage power source has been maintained at 61 Hz for 10 cycles (step S220). If the output frequency of the first energy storage power source fails to be maintained at 61 Hz for 10 cycles, the flow returns to step S218 for continuing to adjust the output frequency of the first energy storage power source to 61 Hz. If the output frequency of the first energy storage power source has been maintained at 61 Hz for 10 cycles, the output frequency of the first energy storage power source is adjusted to 60 Hz (step S222), and the adjustment of the power source frequency of the first energy storage power source is thereby completed.

Figure 3:
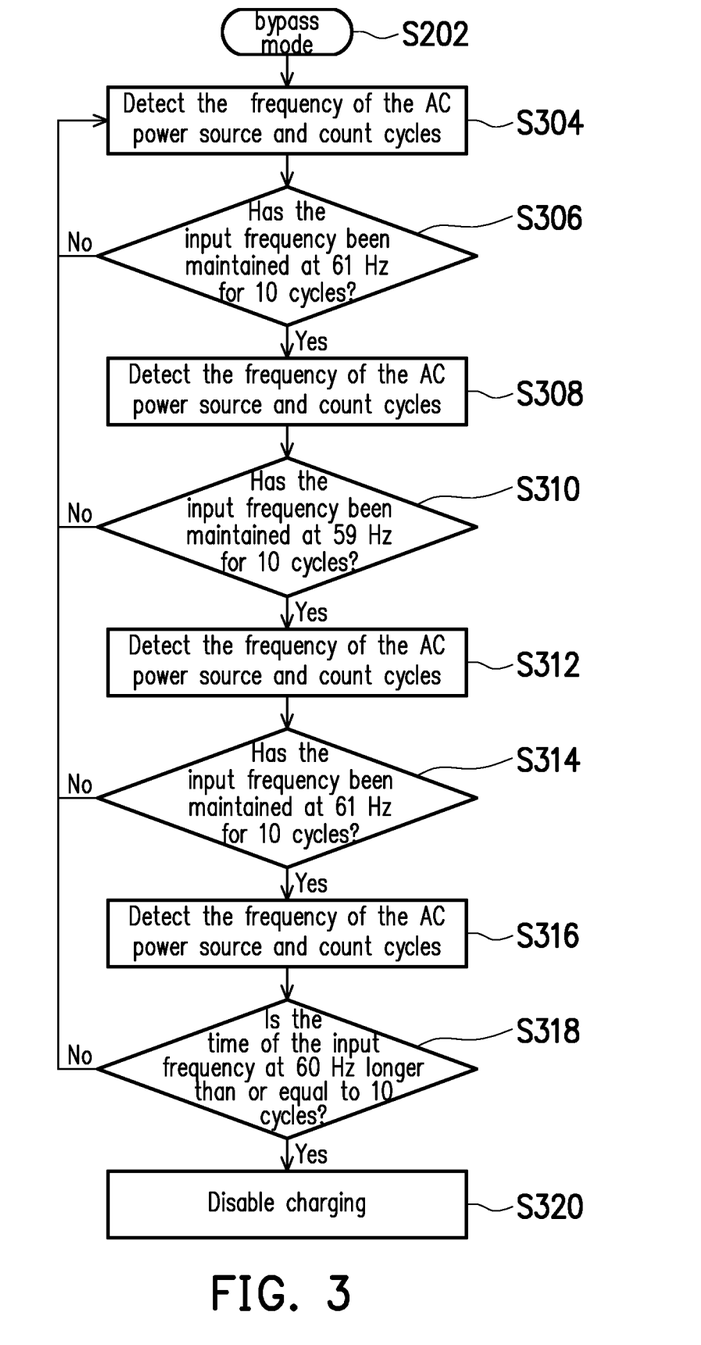
FIG. 3 is a flowchart of determining the power source frequency changes of the first energy storage device according to an embodiment of the disclosure.

Correspondingly, the steps of the second energy storage device 104 determining whether the power source provided by the first energy storage device 102 conforms to the first preset signal characteristic during the first preset period may be as shown in FIG. 3. Assuming that the second energy storage device 104 is in the bypass mode (step S302), the second control circuit 116 may detect the input frequency of the power source input from the first energy storage device 102 to the second energy storage device 104 and count cycles (step S304). Next, the second control circuit 116 determines whether the input frequency of the power source input to the second energy storage device 104 has been maintained at 61 Hz for 10 cycles (step S306). If the input frequency of the power source fails to be maintained at 61 Hz for 10 cycles, the flow returns to step S304 for continuing to detect the input frequency of the power source input to the second energy storage device 104 and count cycles. If the input frequency of the power source has been maintained at 61 Hz for 10 cycles, the flow enters step S308 for detecting the input frequency of the power source and counting cycles. Afterwards, it is determined whether the input frequency of the power source has been maintained at 59 Hz for 10 cycles (step S310). If the input frequency of the power source fails to be maintained at 59 Hz for 10 cycles, the flow returns to step S304. If the input frequency of the power source has been maintained at 59 Hz for 10 cycles, the flow enters step S312 for detecting the input frequency of the power source and counting cycles. Next, it is determined whether the input frequency of the power source has been maintained at 61 Hz for 10 cycles (step S314). If the input frequency of the power source fails to be maintained at 61 Hz for 10 cycles, the flow returns to step S304. If the input frequency of the power source has been maintained at 61 Hz for 10 cycles, the flow enters step S316 for detecting the input frequency of the power source and counting cycles. In following, it is determined whether the time during which the input frequency of the power source is at 60 Hz is longer than or equal to 10 cycles. If the time during which the input frequency of the power source is at 60 Hz is not longer than or equal to 10 cycles, the flow returns to step S304. If the time during which the input frequency of the power source is at 60 Hz is longer than or equal to 10 cycles, it denotes that the power source output from the first energy storage device 102 to the second energy storage device 104 conforms to the first preset signal characteristic and serves as the first energy storage power source. This also suggests that the power source provided by the first energy storage device 102 at the time has been switched from the AC power source 118 to the first energy storage power source provided by the first energy storage circuit 106. Therefore, the second control circuit 116 disables the second energy storage circuit 114 from using the power source provided by the first energy storage device 102 for charging to prevent the second energy storage circuit 114 from consuming the first energy storage power source that the first energy storage circuit 106 provides to the load 120.

It should be noted that the frequency adjustment values of the power source included in the first preset signal characteristic and the length of cycles during which the adjusted frequency of the power source is maintained are merely described as examples. In other embodiments, the number of times of frequency adjustment, the adjusted frequency values, the change sequence of frequency values, and the length of cycles during which the frequency is maintained are not limited to the above example. For example, the change sequence of frequency values may be, for example, →62 Hz→61 Hz→60 Hz→59 Hz→58 Hz→60 Hz, and the length of cycles during which each frequency is maintained may be, for example, 5 cycles, 5 cycles, 10 cycles, 6 cycles, 5 cycles, and 5 cycles in sequence.

Moreover, when the second control circuit 116 detects that the first energy storage device 102 stops providing the power source, such as when the first energy storage circuit 106 runs out of power, the second control circuit 116 may enter the battery mode and control the second energy storage circuit 114 to provide the second energy storage power source to the load 120 through the second switching circuit 112 to extend the time of the energy storage system supplying power to the load 120.

When the first control circuit 110 determines that the AC power source 118 returns to normal from an abnormal state, the first control circuit 110 may control the first switching circuit 108 to switch the output of the first energy storage device 102 to the AC power source 118, and control the first energy storage circuit 106 to output the first energy storage power source that conforms to a second preset signal characteristic during a second preset period before the output of the first energy storage device 102 is switched to the AC power source 118. Similarly, the second energy storage device 104 has also stored the second preset signal characteristic in advance. Similarly, the second preset signal characteristic may include a second preset frequency change rule. The second preset frequency change rule may, for example, serve to switch multiple frequency values of the power source provided by the first energy storage device according to a second sequence during the second preset period, where each of the frequency values is maintained for a corresponding period of time. It should be noted that the second preset frequency change rule included in the second preset signal characteristic is different from the first preset frequency change rule included in the first preset signal characteristic. That is, the first preset signal characteristic is different from the second preset signal characteristic.

Figure 4:
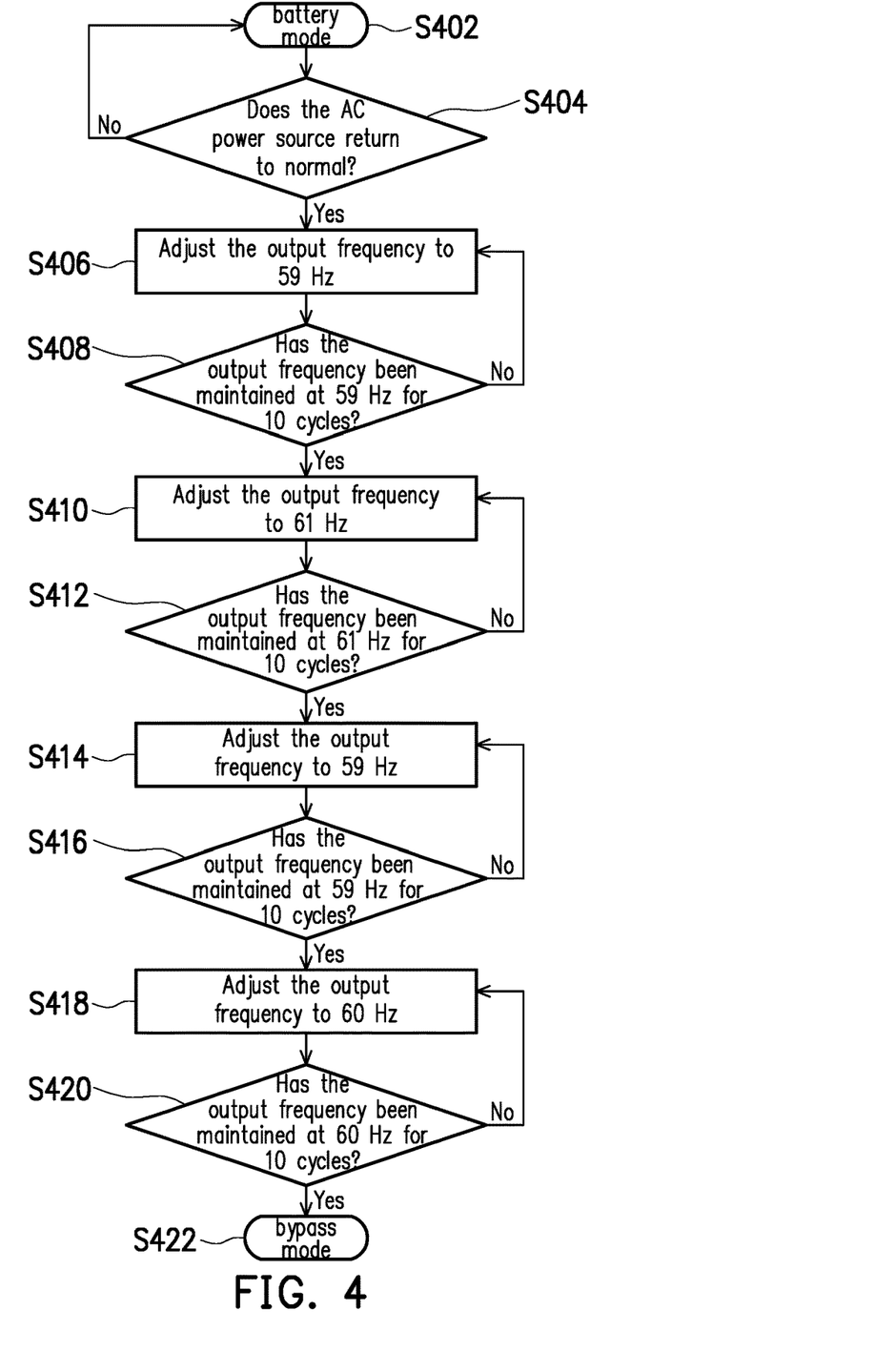
FIG. 4 is a flowchart of power source frequency changes of a first energy storage device according to another embodiment of the disclosure.

For example, FIG. 4 is a flowchart of power source frequency changes of the first energy storage device 102 according to another embodiment of the disclosure. In the embodiment, the first energy storage device 102 is in the battery mode (step S402) in the beginning. The first control circuit 110 may detect whether the AC power source 118 returns to normal (step S404). If the AC power source 118 does not return to normal, the flow may return to step S402 for continuously detecting the power supply condition of the AC power source 118. If the AC power source 118 returns to normal, the first control circuit 110 may control the first energy storage circuit 106 to switch the frequency values of the first energy storage power source in the second sequence during the second preset period. As shown in steps S406 to S420 in FIG. 4, in the embodiment, the frequency change sequence of the first energy storage power source is →59 Hz→61 Hz→59 Hz→60 Hz, and each frequency is maintained for 10 cycles. Since details of changing frequency values in the embodiment are similar to the embodiment in FIG. 2, the same details will not be repeated in the following. When it is determined that the output frequency of the first energy storage power source has been maintained at 60 Hz for 10 cycles in step S420, the first control circuit 110 may return to the bypass mode (step S422) and provide the AC power source 118 to the second energy storage device 104 through the first switching circuit 108 to supply power to the load 120 while charging the second energy storage circuit 114.

Figure 5:
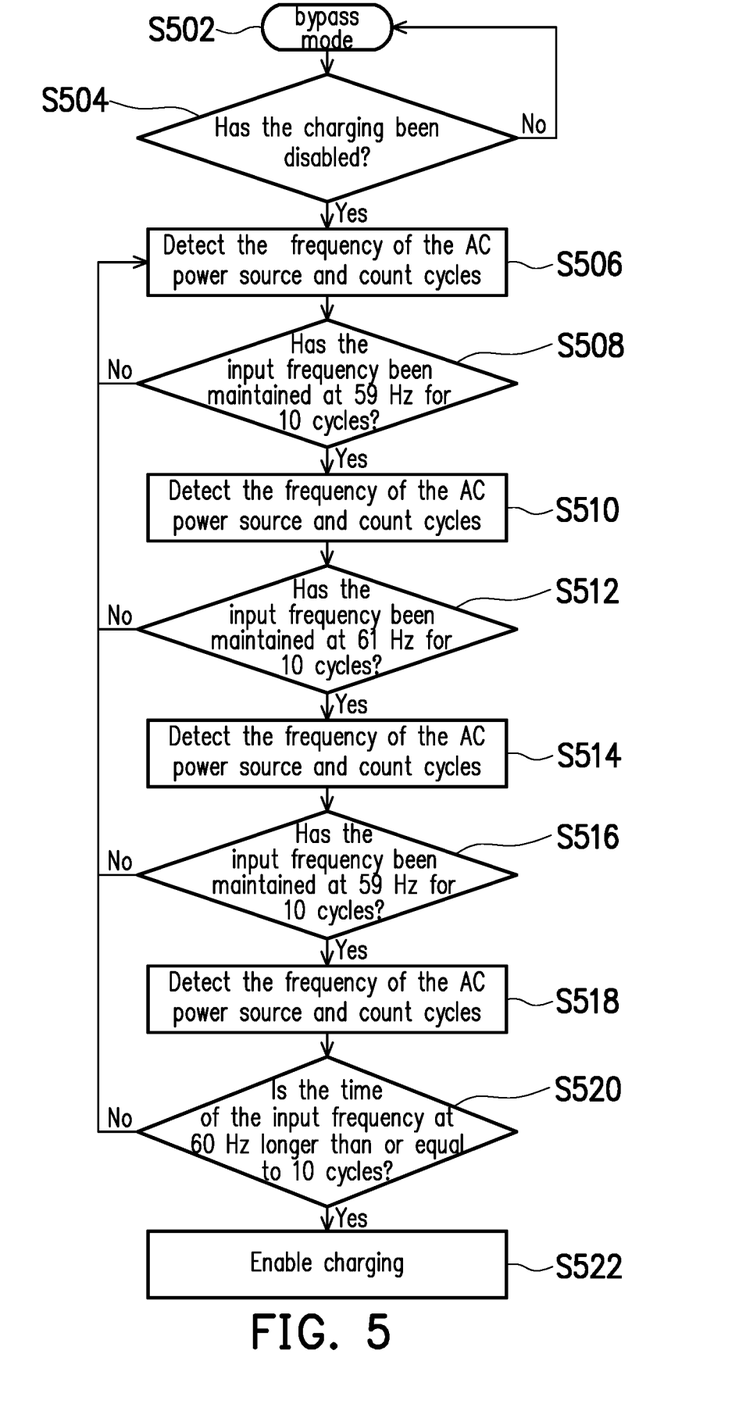
FIG. 5 is a flowchart of determining the power source frequency changes of the first energy storage device according to another embodiment of the disclosure.

Correspondingly, the steps of the second energy storage device 104 determining whether the power source provided by the first energy storage device 102 conforms to the second preset signal characteristic during the second preset period may be as shown in FIG. 5. In the embodiment, the second energy storage device 104 is in the bypass mode (step S502) in the beginning. The second control circuit 116 may determine whether the charging of the second energy storage circuit 114 has been disabled (step S504). If the charging of the second energy storage circuit 114 has not been disabled, the flow returns to step S502. If the charging of the second energy storage circuit 114 has been disabled, changes of the frequency values of the power source provided by the first energy storage device 102 may be detected, as shown in steps S506 to S520. When the second control circuit 116 detects that the changes of the frequency values of the power source provided by the first energy storage device 102 meet the frequency change rule in the embodiment in FIG. 4, that is, the frequency change sequence of the power source provided by the first energy storage device 102 is →59 Hz→61 Hz→59 Hz→60 Hz and each frequency has been maintained for 10 cycles, it denotes that the AC power source 118 has returned to normal. Since details of detecting the changes of frequency values in the embodiment is similar to the embodiment in FIG. 3, the same details will not be repeated in the following. When it is determined that the frequency of the power source provided by the first energy storage device 102 has been maintained at 60 Hz for 10 cycles in step S520, the second control circuit 116 enables the charging of the second energy storage circuit 114 (step S522) and allows the second energy storage circuit 114 to use the AC power source 118 for charging.

Figure 6:
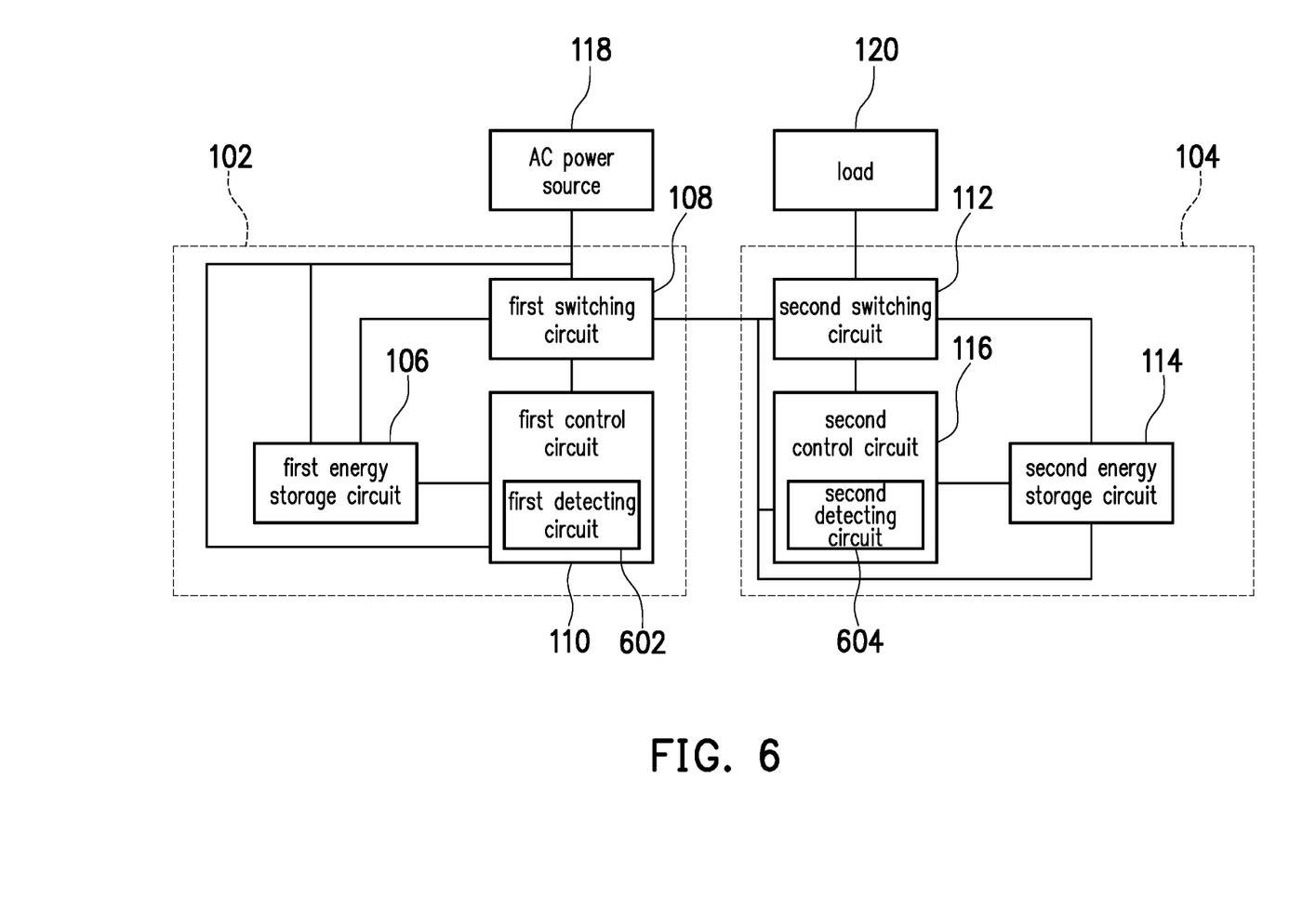
FIG. 6 is a schematic diagram of an energy storage system according to another embodiment of the disclosure.

FIG. 6 is a schematic diagram of an energy storage system according to another embodiment of the disclosure. With reference to FIG. 6, the difference between the energy storage system in the embodiment and the energy storage system in FIG. 1 lies in that the first control circuit 110 and the second control circuit 116 include a first detecting circuit 602 and a second detecting circuit 604 respectively. The first detecting circuit 602 is coupled to the input terminal of the first energy storage device 102 and the second detecting circuit 604 is coupled to the input terminal of the second energy storage device 104. The first detecting circuit 602 may detect the AC power source 118 to generate a first detecting signal, and the first control circuit 110 may determine the power supply condition of the AC power source 118 according to the first detecting signal. The second detecting circuit 604 may detect the power source provided by the first energy storage device 102 to generate a second detecting signal, and the second control circuit 116 may determine the power supply state of the first energy storage device 102 according to the second detecting signal. Since details of adjusting the power supply of the first energy storage device 102 and the second energy storage device 104 according to the power supply state of the AC power source 118 has been explained in the above embodiment, the same details will not be repeated in the following.

Figure 7:
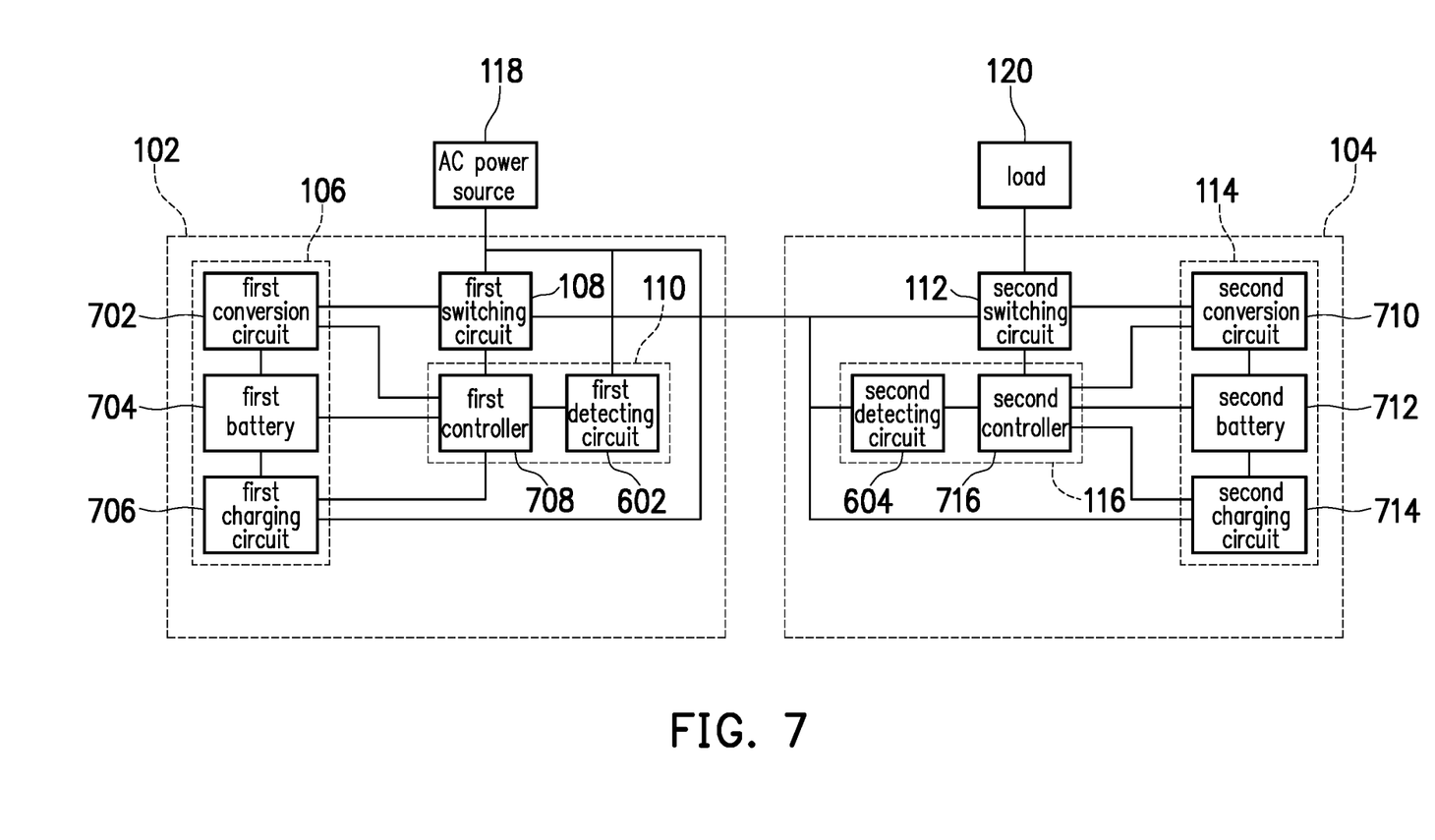
FIG. 7 is a schematic diagram of an energy storage system according to another embodiment of the disclosure.

FIG. 7 is a schematic diagram of an energy storage system according to another embodiment of the disclosure. With reference to FIG. 7, in the embodiment, the first energy storage circuit 106 may include a first conversion circuit 702, a first battery 704, and a first charging circuit 706. The first control circuit 110 may include a first controller 708 and the first detecting circuit 602. The second energy storage circuit 114 may include a second conversion circuit 710, a second battery 712, and a second charging circuit 714. The second control circuit 116 may include a second controller 716 and the second detecting circuit 604. The first battery 704 is coupled to the first conversion circuit 702 and the first charging circuit 706, the first conversion circuit 702 is further coupled to the first switching circuit 108, the first charging circuit 706 is further coupled to the first controller 708, and the first controller 708 is further coupled to the first detecting circuit 602. The second battery 712 is coupled to the second conversion circuit 710 and the second charging circuit 714, the second conversion circuit 710 is further coupled to the second switching circuit 112, the second charging circuit 714 is further coupled to the second controller 716, and the second controller 716 is further coupled to the second detecting circuit 604.

The first battery 704 and the second battery 712 may be configured to store electric power. The first conversion circuit 702 and the second conversion circuit 710 may be controlled by the first controller 708 and the second controller 716 respectively to convert the electric power stored in the first battery 704 and the second battery 712 to AC power source, and respectively adopt the converted AC power source as the first energy storage power source and the second energy storage power source. The first charging circuit 706 may be controlled by the first controller 708 to charge the first battery 704 by using the AC power source 118. The second charging circuit 714 may be controlled by the second controller 716 to charge the second battery 712 by using the AC power source 118 provided by the first energy storage device 102. In more detail, the first controller 708 and the second controller 716 may further detect the power storage states of the first battery 704 and the second battery 712 respectively, and control the charging and discharging of the first battery 704 and the second battery 712 according to the power storage states of the first battery 704 and the second battery 712 to extend the service lives of the first battery 704 and the second battery 712. In addition, the first controller 708 may further determine whether the AC power source 118 is abnormal according to the first detecting signal provided by the first detecting circuit 602, and control the first switching circuit 108 to switch between outputting the AC power source 118 and outputting the first energy storage power source provided by the first conversion circuit 702 to the output terminal of the first energy storage device 102 according to whether the AC power source 118 is abnormal. The second controller 716 may further determine the power supply state of the first energy storage device 102 according to the second detecting signal provided by the second detecting circuit 604, and control the second switching circuit 112 to switch between outputting the power source provided by the first energy storage device 102 and outputting the second energy storage power source provided by the second conversion circuit 710 to the load 120 according to the power supply state of the first energy storage device 102. Since the technical means of the first controller and the second controller are similar to the technical means of the first control circuit 110 and the second control circuit 116 described above, the same technical means will not be repeated in the following.

Figure 8:
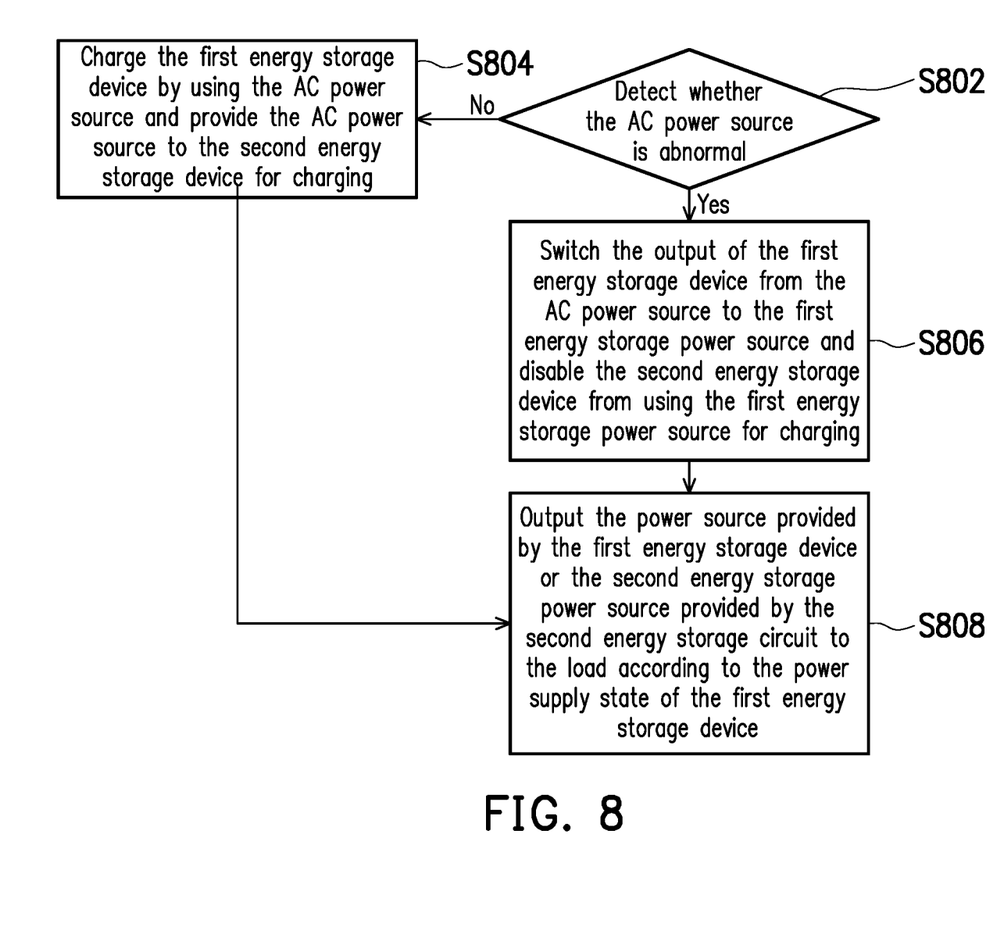
FIG. 8 is a flowchart of a power supply method of an energy storage system according to an embodiment of the disclosure.

FIG. 8 is a flowchart of a power supply method of an energy storage system according to an embodiment of the disclosure. The energy storage system includes the first energy storage device and the second energy storage device that are connected in series between the AC power source and the load. According to the above embodiments, the power supply method of the energy storage system may at least include the following steps. First, it is detected whether the AC power source is abnormal (step S802). If the AC power source is normal, the first energy storage device is charged by using the AC power source, and the AC power source is provided to the second energy storage device for charging (step S804). If the AC power source is abnormal, the output of the first energy storage device is switched from the AC power source to the first energy storage power source, and the second energy storage device is disabled from using the first energy storage power source for charging (step S806), so as to prevent the second energy storage device from consuming the first energy storage power source and affecting the power provided to the load. In addition, after steps S804 and S806, the flow may enter step S808 for outputting the power source provided by the first energy storage device or the second energy storage power source provided by the second energy storage circuit to the load according to the power supply state of the first energy storage device. When the first energy storage device is still capable of providing power, the power source output by the first energy storage device may be provided to the load. When the first energy storage device runs out of power, the second energy storage power source of the second energy storage circuit may be provided to the load to extend the power supply time of the energy storage system.

Figure 9:
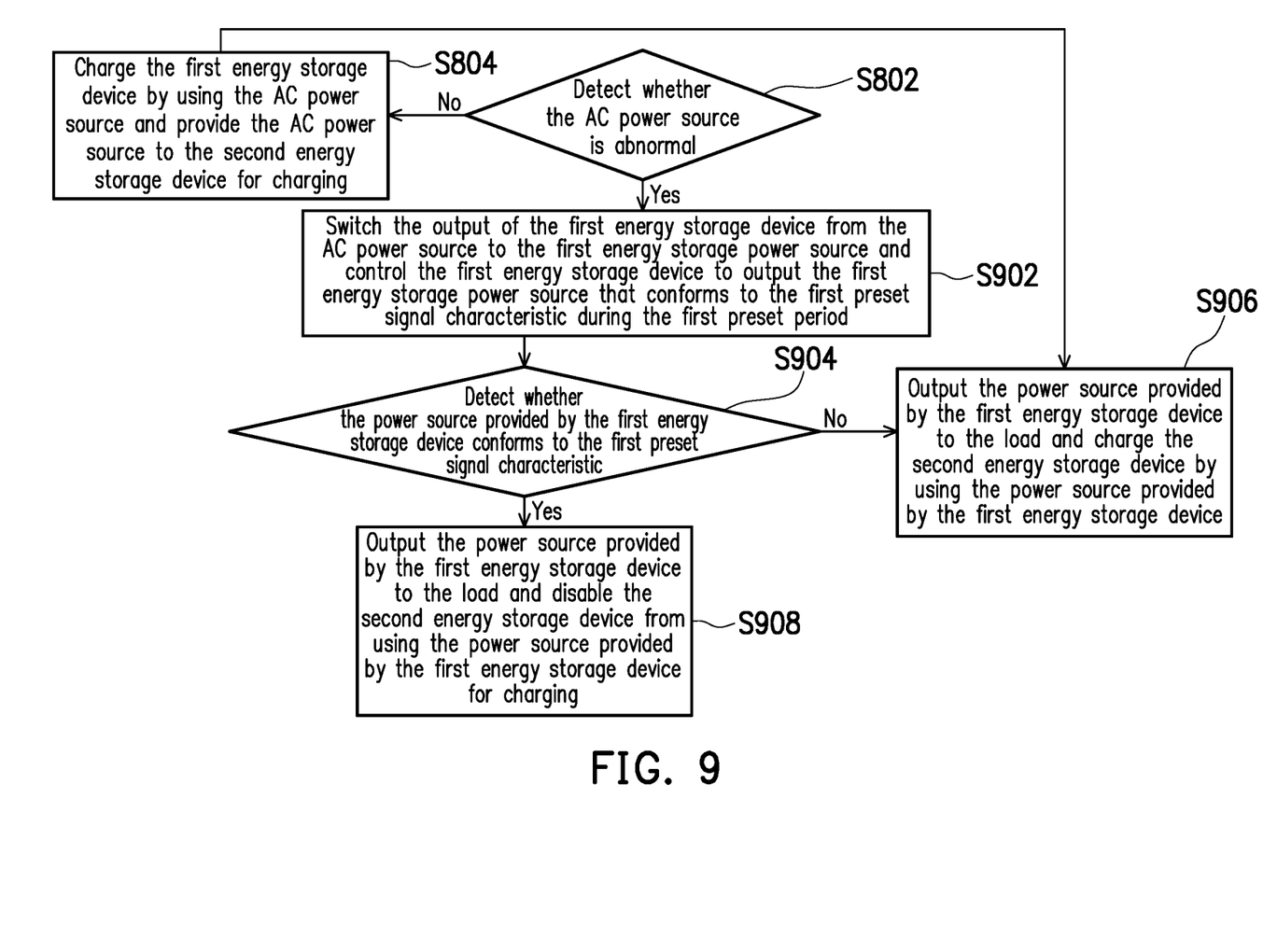
FIG. 9 is a flowchart of a power supply method of an energy storage system according to another embodiment of the disclosure.

FIG. 9 is a flowchart of a power supply method of an energy storage system according to another embodiment of the disclosure. In the embodiment, when it is detected that the AC power source is abnormal in step S802, the output of the first energy storage device may be switched from the AC power source to the first energy storage power source, and the first energy storage device may be controlled to output the first energy storage power source that conforms to the first preset signal characteristic during the first preset period (step S902). The first preset signal characteristic includes the first preset frequency change rule. The first preset frequency change rule may, for example, serve to switch multiple frequency values of the power source provided by the first energy storage device according to the first sequence during the first preset period. Each frequency value is maintained for a corresponding period of time. Next, it is detected whether the power source provided by the first energy storage device conforms to the first preset signal characteristic during the first preset period (step S904). If the power source provided by the first energy storage device does not conform to the first preset signal characteristic, the power source provided by the first energy storage device is output to the load, and the second energy storage device is charged by using the power source provided by the first energy storage device (step S906). In addition, when it is detected that the AC power source is normal in step S802, the flow may enter step S804 for charging the first energy storage device by using the AC power source and providing the AC power source to the second energy storage device for charging. Next, the flow enters step S906 for charging the second energy storage device by using the power source provided by the first energy storage device. In step S904, if the power source provided by the first energy storage device conforms to the first preset signal characteristic, the power source provided by the first energy storage device is output to the load, and the second energy storage device is disabled from using the power source provided by the first energy storage device for charging (step S908) to prevent the second energy storage device from consuming the power source provided by the first energy storage.

Figure 10:
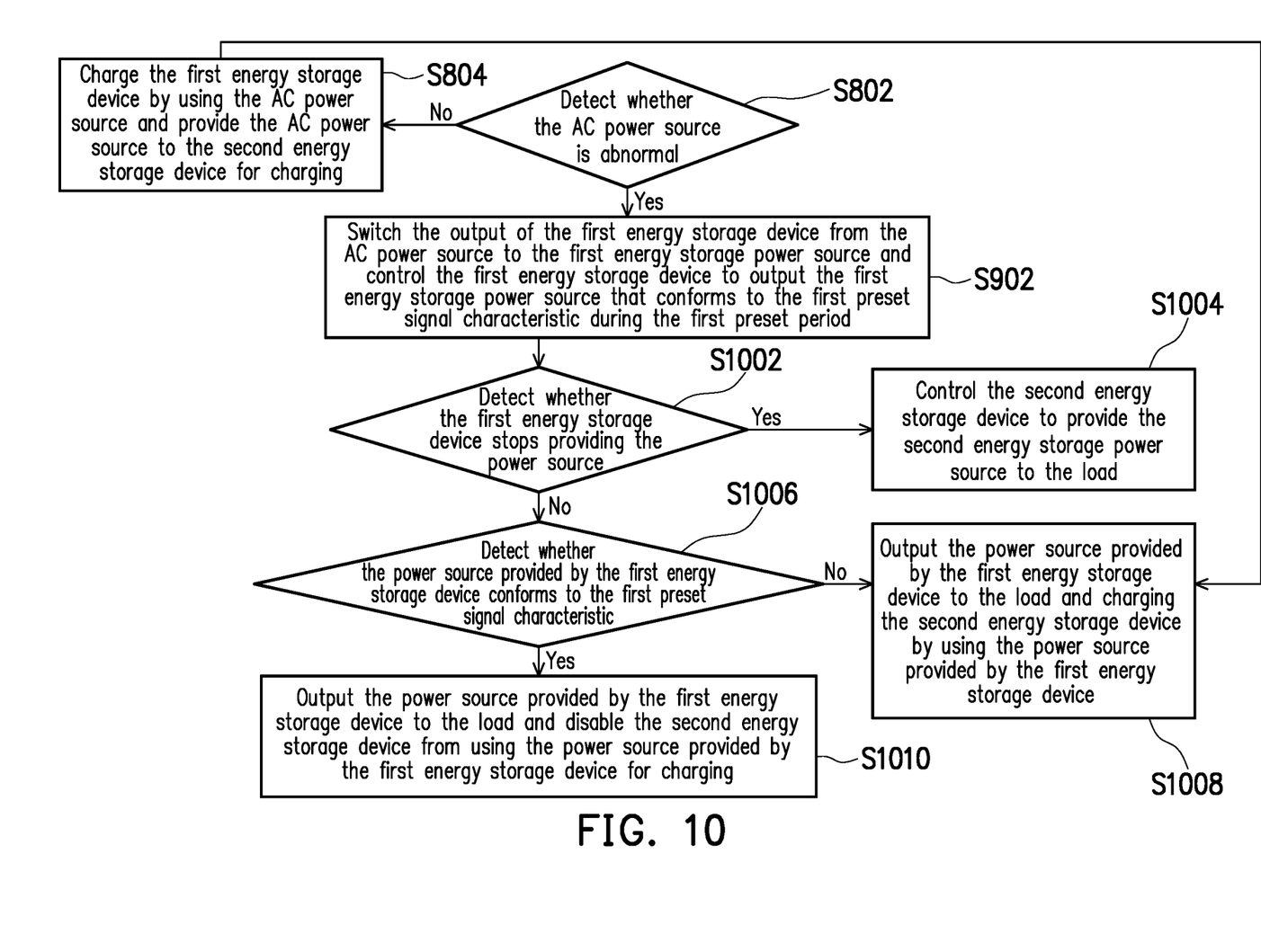
FIG. 10 is a flowchart of a power supply method of an energy storage system according to another embodiment of the disclosure.

FIG. 10 is a flowchart of a power supply method of an energy storage system according to another embodiment of the disclosure. In the embodiment, after step S902, it may further be detected whether the first energy storage device stops providing the power source (step S1002). If the first energy storage device stops providing the power source, the second energy storage device may be controlled to provide the second energy storage power source to the load (step S1004) to extend the power supply time of the energy storage system. If the first energy storage device does not stop providing the power source, it may be detected whether the power source provided by the first energy storage device conforms to the first preset signal characteristic during the first preset period (step S1006). If the power source provided by the first energy storage device does not conform to the first preset signal characteristic, the power source provided by the first energy storage device may be output to the load, and the power source provided by the first energy storage device may be used to charge the second energy storage device (step S1008). Similarly, in the embodiment, after step S804, the flow may enter step S1008 for charging the second energy storage device by using the power source provided by the first energy storage device. If the power source provided by the first energy storage device conforms to the first preset signal characteristic, the power source provided by the first energy storage device is output to the load, and the second energy storage device is disabled from using the power source provided by the first energy storage device for charging (step S1010), in order to prevent the second energy storage device from consuming the power source provided by the first energy storage.

Figure 11:
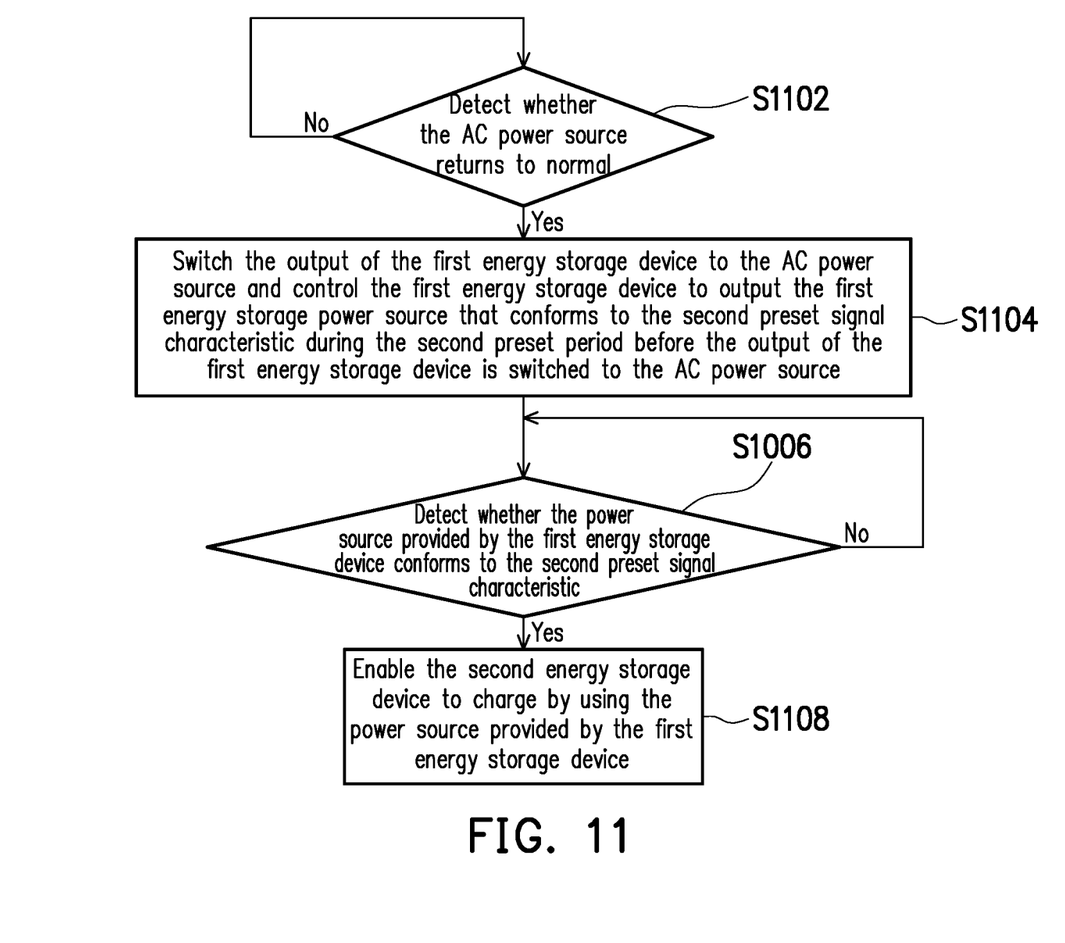
FIG. 11 is a flowchart of a power supply method of an energy storage system according to another embodiment of the disclosure.

FIG. 11 is a flowchart of a power supply method of an energy storage system according to another embodiment of the disclosure. In the embodiment, it is assumed that the AC power source is abnormal in the beginning. In step S1102, it may be detected whether the AC power source returns to normal. If it is detected that the AC power supply has not returned to normal, the detection of whether the AC power supply has returned to normal is continuously performed in step S1102. If it is detected that the AC power supply has returned to normal, the flow enters step S1104 for switching the output of the first energy storage device to the AC power source and controlling the first energy storage device to output the first energy storage power source that conforms to the second preset signal characteristic during the second preset period before the output of the first energy storage device is switched to the AC power source (step S1104). The second preset signal characteristic may include the second preset frequency change rule that is different from the first preset frequency change rule. The second preset frequency change rule may, for example, serve to switch multiple frequency values of the power source provided by the first energy storage device according to the second sequence during the second preset period. Each frequency value is maintained for a corresponding period of time. In following, it is continuously detected whether the power source provided by the first energy storage device conforms to the second preset signal characteristic during the second preset period (step S1106). When it is detected that the power source provided by the first energy storage device conforms to the second preset signal characteristic, the second energy storage device is enabled to use the power source provided by the first energy storage device for charging (step S1108).

In summary, according to the embodiments of the disclosure, the first energy storage device and the second energy storage device are connected in series between the AC power source and the load. When the AC power source is normal, the first energy storage device is charged by using the AC power source, and the AC power source may be provided to the second energy storage device for charging. When the AC power source is abnormal, the output of the first energy storage device may be switched from the AC power source to the first energy storage power source, and the second energy storage device may be disabled from using the first energy storage power source for charging. In addition, the power source provided by the first energy storage device or the second energy storage power source provided by the second energy storage circuit is output to the load according to the power supply state of the first energy storage device. This way, by connecting the first energy storage device and the second energy storage device in series between the AC power source and the load and adjusting the power supply of the first energy storage device and the second energy storage device according to the power supply state of the AC power source, the total discharge capacity of the energy storage system may be effectively increased, and the power supply time may be greatly extended. Moreover, multiple energy storage devices may be connected in series according to the power demand, instead of being limited to two energy storage devices. In addition, in some embodiments, the frequency of the power source provided by the first energy storage device may be adjusted to notify the changes of the power supply source to the second energy storage device. Therefore, no additional communication line is required.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An energy storage system, comprising:
a first energy storage device, having an input terminal coupled to an AC power source and comprising:
a first energy storage circuit, which is coupled to the AC power source and uses the AC power source for charging;
a first switching circuit, which is coupled to the first energy storage circuit and the input terminal and an output terminal of the first energy storage device; and
a first control circuit, which is coupled to the first energy storage circuit, the first switching circuit, and the input terminal of the first energy storage device, and, according to whether the AC power source is abnormal, controls the first switching circuit to switch between outputting the AC power source and outputting a first energy storage power source provided by the first energy storage circuit to the output terminal of the first energy storage device; and
a second energy storage device, connected in series with the first energy storage device between the AC power source and a load, having an input terminal and an output terminal respectively coupled to the output terminal of the first energy storage device and the load, and comprising:
a second energy storage circuit, which is coupled to the input terminal of the second energy storage device and uses the AC power source provided by the first energy storage device for charging;
a second switching circuit, which is coupled to the second energy storage circuit, and the input terminal and the output terminal of the second energy storage device; and
a second control circuit, which is coupled to the second energy storage circuit, the second switching circuit, and the input terminal of the second energy storage device, and, according to a power supply state of the first energy storage device, controls the second switching circuit to switch between outputting a power source provided by the first energy storage device and outputting a second energy storage power source provided by the second energy storage circuit to the load.

2. The energy storage system according to claim 1, wherein the first control circuit, when detecting that the AC power source is abnormal, controls the first switching circuit to switch an output of the first energy storage device to the first energy storage power source, and controls the first energy storage circuit to output the first energy storage power source that conforms to a first preset signal characteristic during a first preset period, and the second control circuit, when detecting that the power source provided by the first energy storage device conforms to the first preset signal characteristic, disables the second energy storage circuit from using the power source provided by the first energy storage device for charging.

3. The energy storage system according to claim 2, wherein the first control circuit, when determining that the AC power source returns to normal, controls the first switching circuit to switch the output of the first energy storage device to the AC power source, and controls the first energy storage circuit to output the first energy storage power source that conforms to a second preset signal characteristic during a second preset period before the output of the first energy storage device is switched to the AC power source.

4. The energy storage system according to claim 3, wherein the second control circuit, when the power source output by the first energy storage device conforms to the second preset signal characteristic, enables the second energy storage circuit to use the power source provided by the first energy storage device for charging.

5. The energy storage system according to claim 3, wherein the first preset signal characteristic is different from the second preset signal characteristic.

6. The energy storage system according to claim 3, wherein the first preset signal characteristic comprises a first preset frequency change rule, and the second preset signal characteristic comprises a second preset frequency change rule.

7. The energy storage system according to claim 6, wherein the first preset frequency change rule serves to switch a plurality of frequency values of the power source provided by the first energy storage device according to a first sequence during the first preset period, wherein each of the frequency values is maintained for a corresponding period of time.

8. The energy storage system according to claim 6, wherein the second preset frequency change rule serves to switch a plurality of frequency values of the power source provided by the first energy storage device according to a second sequence during the second preset period, wherein each of the frequency values is maintained for a corresponding period of time.

9. The energy storage system according to claim 1, wherein the second control circuit, when detecting that the first energy storage device stops providing the power source, controls the second energy storage circuit to provide the second energy storage power source to the load through the second switching circuit.

10. The energy storage system according to claim 1, wherein the first control circuit comprises:
a first detecting circuit, which is coupled to the input terminal of the first energy storage device and detects the AC power source to generate a first detecting signal, wherein the first control circuit determines whether the AC power source is abnormal according to the first detecting signal.

11. The energy storage system according to claim 1, wherein the second control circuit comprises:
a second detecting circuit, which is coupled to the input terminal of the second energy storage device and detects the power source provided by the first energy storage device to generate a second detecting signal, wherein the second control circuit determines the power supply state of the first energy storage device according to the second detecting signal.

12. A power supply method of an energy storage system, wherein the energy storage system comprises a first energy storage device and a second energy storage device connected in series between an AC power source and a load, and the power supply method of the energy storage system comprises:
detecting whether the AC power source is abnormal;
if the AC power source is normal, charging the first energy storage device by using the AC power source and providing the AC power source to the second energy storage device for charging;
if the AC power source is abnormal, switching an output of the first energy storage device from the AC power source to a first energy storage power source and disabling the second energy storage device from using the first energy storage power source for charging; and
outputting a power source provided by the first energy storage device or a second energy storage power source provided by the second energy storage circuit to the load according to a power supply state of the first energy storage device.

13. The power supply method of the energy storage system according to claim 12, comprising:
when detecting that the AC power source is abnormal, controlling the first energy storage device to output the first energy storage power source that conforms to a first preset signal characteristic during a first preset period;
detecting whether the power source provided by the first energy storage device conforms to the first preset signal characteristic;
if the power source provided by the first energy storage device does not conform to the first preset signal characteristic, outputting the power source provided by the first energy storage device to the load and charging the second energy storage device by using the power source provided by the first energy storage device; and
if the power source provided by the first energy storage device conforms to the first preset signal characteristic, outputting the power source provided by the first energy storage device to the load and disabling the second energy storage device from using the power source provided by the first energy storage device for charging.

14. The power supply method of the energy storage system according to claim 13, wherein when it is detected that the AC power source returns to normal, the output of the first energy storage device is switched to the AC power source, and the first energy storage device is controlled to output the first energy storage power source that conforms to a second preset signal characteristic during a second preset period before the output of the first energy storage device is switched to the AC power source.

15. The power supply method of the energy storage system according to claim 14, comprising:
when the power source output by the first energy storage device conforms to the second preset signal characteristic, enabling the second energy storage device to use the power source provided by the first energy storage device for charging.

16. The power supply method of the energy storage system according to claim 13, wherein the first preset signal characteristic is different from the second preset signal characteristic.

17. The power supply method of the energy storage system according to claim 13, wherein the first preset signal characteristic comprises a first preset frequency change rule, and the second preset signal characteristic comprises a second preset frequency change rule.

18. The power supply method of the energy storage system according to claim 17, wherein the first preset frequency change rule serves to switch a plurality of frequency values of the power source provided by the first energy storage device according to a first sequence during the first preset period, wherein each of the frequency values is maintained for a corresponding period of time.

19. The power supply method of the energy storage system according to claim 17, wherein the second preset frequency change rule serves to switch a plurality of frequency values of the power source provided by the first energy storage device according to a second sequence during the second preset period, wherein each of the frequency values is maintained for a corresponding period of time.

20. The power supply method of the energy storage system according to claim 12, comprising:
when it is detected that the first energy storage device stops providing the power source, controlling the second energy storage device to provide the second energy storage power source to the load.

* * * * *